(12) United States Patent
Werkheiser et al.

(10) Patent No.: US 11,773,686 B2
(45) Date of Patent: Oct. 3, 2023

(54) ELECTROSTATIC MOTOR CONTROL OF A SUB SURFACE SAFETY VALVE

(71) Applicant: Halliburton Energy Services, Inc., Houston, TX (US)

(72) Inventors: Gregory Thomas Werkheiser, Carrollton, TX (US); Michael Linley Fripp, Carrollton, TX (US); Xiaoguang Allan Zhong, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 19 days.

(21) Appl. No.: 17/236,288

(22) Filed: Apr. 21, 2021

(65) Prior Publication Data

US 2022/0341285 A1    Oct. 27, 2022

(51) Int. Cl.
*E21B 34/06*     (2006.01)
*H02N 1/00*      (2006.01)
*E21B 34/08*     (2006.01)
*E21B 34/10*     (2006.01)

(52) U.S. Cl.
CPC ............ *E21B 34/066* (2013.01); *E21B 34/08* (2013.01); *E21B 34/102* (2013.01); *H02N 1/004* (2013.01); *E21B 2200/05* (2020.05)

(58) Field of Classification Search
CPC ...... E21B 34/066; E21B 34/08; E21B 34/102; E21B 2200/05; H02N 1/004
See application file for complete search history.

(56) References Cited

U.S. PATENT DOCUMENTS

| | | | | |
|---|---|---|---|---|
| 5,070,944 A * | 12/1991 | Hopper | ................. | E21B 34/066 251/129.21 |
| 6,253,843 B1 * | 7/2001 | Rawson | ................ | E21B 34/066 166/332.8 |
| 6,619,388 B2 | 9/2003 | Dietz et al. | | |
| 8,176,975 B2 * | 5/2012 | Lake | ...................... | E21B 34/066 166/250.01 |
| 8,464,799 B2 * | 6/2013 | Scott | ........................ | E21B 34/16 166/373 |
| 10,480,283 B2 | 11/2019 | Joseph et al. | | |
| 10,670,160 B2 * | 6/2020 | Phelps | ................... | F16K 31/502 |
| 2007/0295515 A1 * | 12/2007 | Veneruso | .............. | E21B 34/066 166/66.6 |
| 2019/0296659 A1 | 9/2019 | Reitz et al. | | |
| 2020/0270965 A1 * | 8/2020 | Vick, Jr. | ............... | E21B 34/066 |
| 2020/0308922 A1 * | 10/2020 | Greci | ...................... | E21B 23/06 |

OTHER PUBLICATIONS

"EcoStar Electric Tubing—Retrievable Safety Valve", [online] retrieved on Mar. 30, 2021 from https://cdn.brandfolder.io/OUSGG99Q/as/c8cmhwkmv98qrvtqrkqkjwb/EcoStar_eTRSV_-_H012530-DS.pdf.

* cited by examiner

*Primary Examiner* — Caroline N Butcher
(74) *Attorney, Agent, or Firm* — DELIZIO, PEACOCK, LEWIN & GUERRA

(57) ABSTRACT

An apparatus includes a sub-surface safety valve (SSSV) to be positioned in a wellbore. The SSSV is configurable to move between a closed position and an open position. While in the closed position, the SSSV prevents downhole fluid in the wellbore to flow to a surface of the wellbore. While in the open position, the SSSV allows the downhole fluid in the wellbore to flow to the surface of the wellbore. The apparatus further includes an electrostatic motor to be positioned in the wellbore and to be coupled to the SSSV. The electrostatic motor is to be selectively powered to move the SSSV between the closed position and the open position.

17 Claims, 9 Drawing Sheets

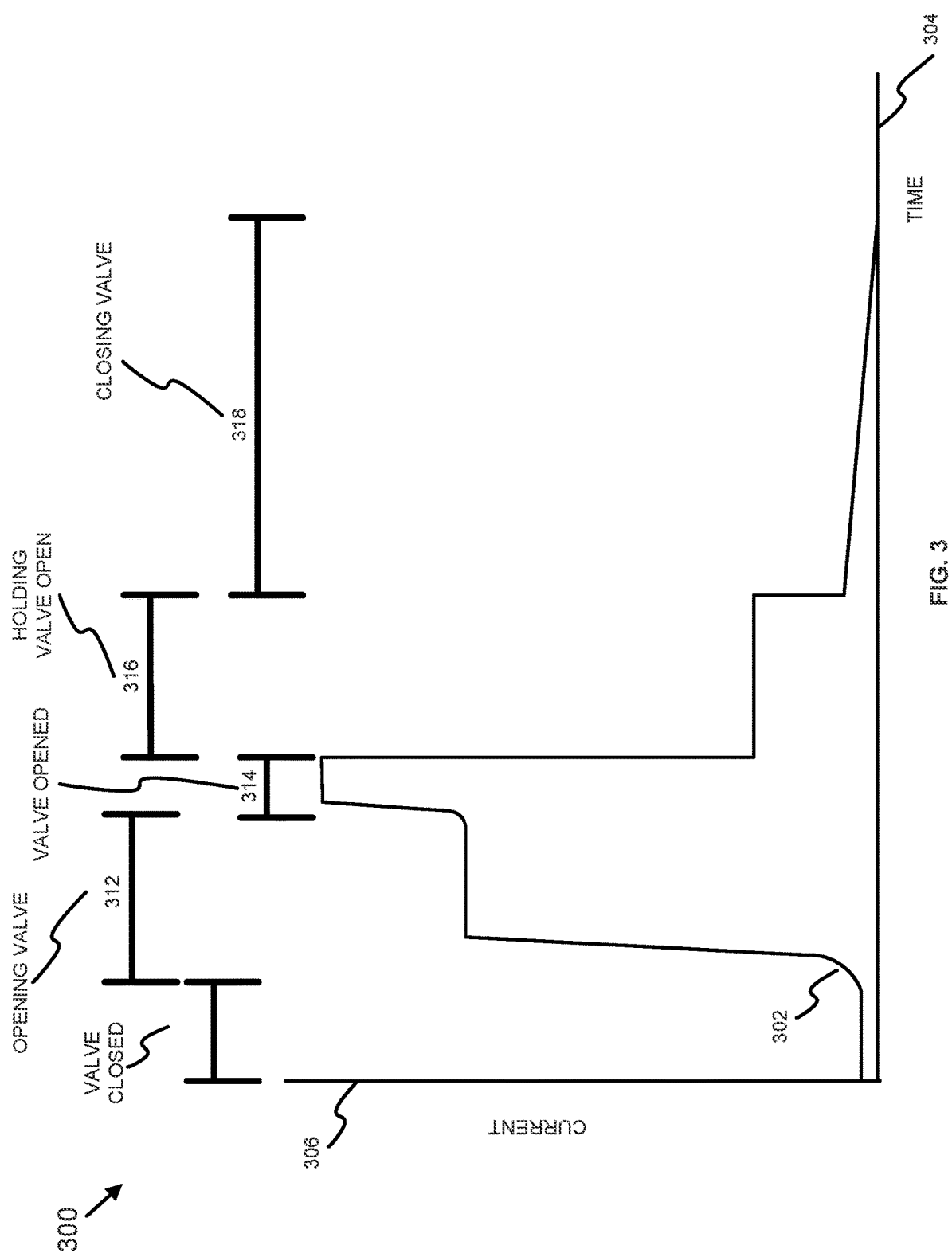

ELECTROSTATIC MOTOR CONTROL OF A SUB SURFACE SAFETY VALVE

TECHNICAL FIELD

The disclosure generally relates to the field of oil and gas production and more particularly to sub-surface safety valves.

BACKGROUND

Wellbores are drilled in subterranean formations to access oil, gas, and other deposits within geological formations. Once a wellbore has been drilled, it is then cased for completion. Often, hydrocarbon producing wells include a sub-surface safety valve (SSSV) positioned within the casing to enable, prevent, or vary a flow of production fluid through the casing. In addition to enabling and preventing the flow of fluids through the casing, SSSVs can be used to halt production from the wellbore in the case of an emergency.

BRIEF DESCRIPTION OF THE DRAWINGS

Embodiments of the disclosure may be better understood by referencing the accompanying drawings.

FIG. 3 depicts a graph of current draw by an electrostatic motor for SSSV operations of FIGS. 2A-2B as a function of time, according to some embodiments.

DESCRIPTION OF EMBODIMENTS

Figure 1:
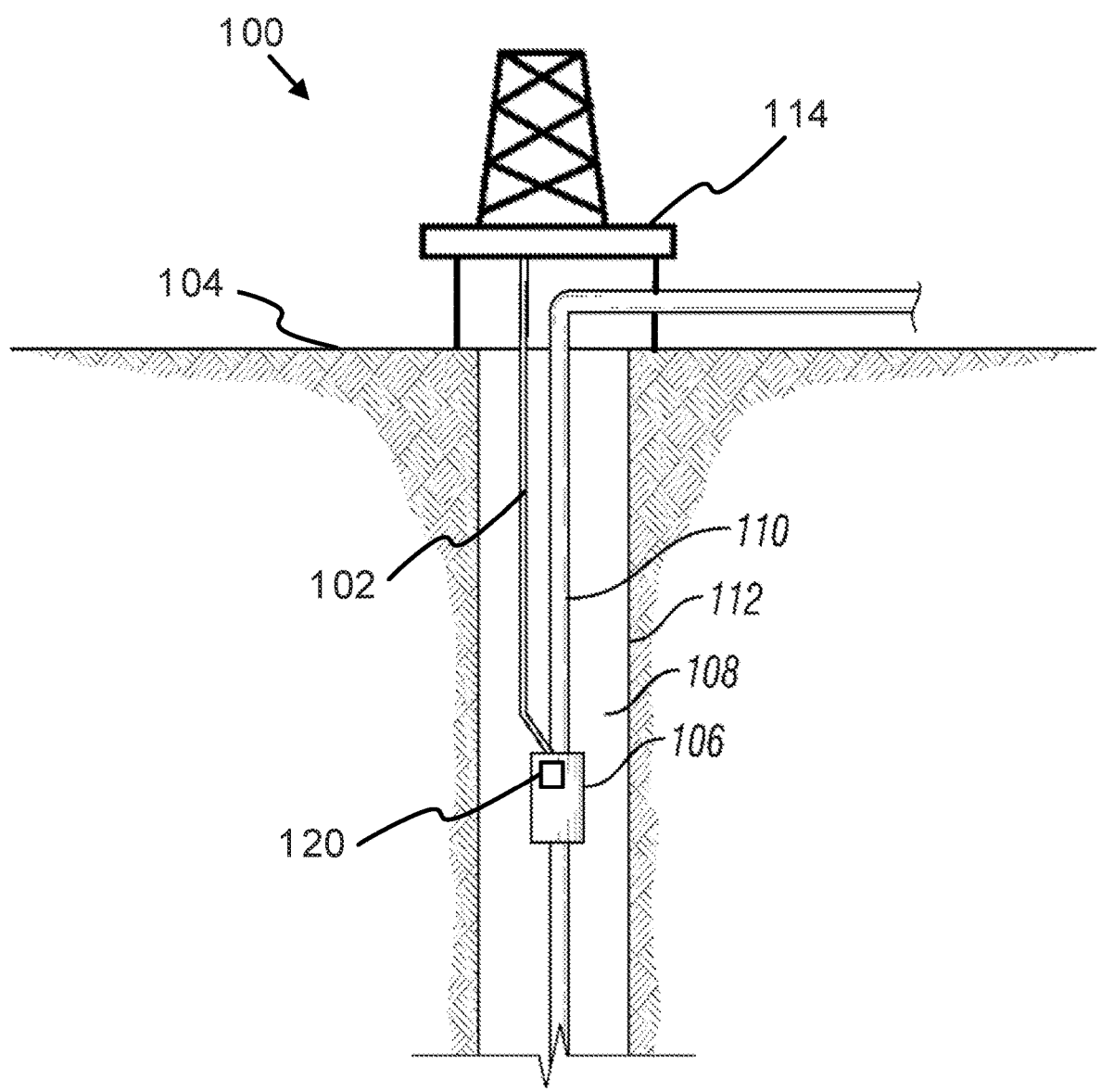
FIG. 1 depicts an example completed well system, according to some embodiments.

The description that follows includes example systems, methods, techniques, and program flows that embody embodiments of the disclosure. However, it is understood that this disclosure may be practiced without these specific details. For instance, this disclosure refers to sub-surface safety valves (SSSVs) in illustrative examples. Embodiments of this disclosure can be also applied to other types of valves in downhole or surface applications. In other instances, well-known instruction instances, protocols, structures, and techniques have not been shown in detail in order not to obfuscate the description.

Conventional well completions employing SSSVs often utilize hydraulic lines to control the opening and closing of SSSVs. In contrast, electric well completions can employ electrically controlled SSSVs (eSSSVs) that are controlled by electric lines instead of conventional hydraulic lines. Such electrical control from the surface of the borehole can be easier and more accurate (in comparison to conventional hydraulic control). This is especially true for wellbores formed underwater. Electric SSSVs can include motors, actuators, electromagnetic locking mechanisms, etc. Traditional electric motors have magnets and windings and can require electric clutches to ensure fail-safe operation.

Operation of electrostatic motors differ from operation of traditional electric motors. For example, operation of electrostatic motors is based on attraction and repulsion of electric charges. When a supply voltage is removed, an electrostatic motor can rotate freely, eliminating the need for an electric clutch. Additionally, recent developments in electrostatic motors have enabled increased torque and power efficiency, reducing the power necessary to operate electrostatic motors under load.

Various embodiments can include incorporation of electrostatic motors to operate and control SSSVs in a downhole operation. For example, electrostatic motors can operate and control SSSVs in a hydrocarbon production operation in a wellbore. The SSSVs can act as a fail-safe in the event of failure. For example, if fluids flowing to the surface of the wellbore are being captured or contained because of equipment failure, an SSSV can be closed to prevent fluids from flowing to the surface until the failure is corrected. In some implementations, the SSSV can be opened by supplying power to an electrostatic motor. The SSSV can remain open by continuing to supply power to the electrostatic motor. Thus, the SSSV can be closed by no longer supplying power to the electrostatic motor. Typical electric motors use energized coils. In contrast, an electrostatic motor can use charged plates to create movement. Also, one of the properties of electrostatic motors is that they spin freely when not energized and only a small amount of power is used to energize to keep these motors from moving.

Because an electrostatic motor is used, lower current draw is needed to keep the SSSV closed (in comparison to other types of electric motors). Thus, by using an electrostatic motor, example embodiments can provide an electrically powered control of SSSVs in a wellbore (without using conventional electric motors, actuators, electromagnetic locking that require higher current draw). Thus, example embodiments provide an easier and more accurate control of the SSSVs but with much less power needed to keep the SSSV locked in an open position.

In some embodiments, an electrostatic motor can be used with a drive screw to move a flow tube to open an SSSV. Springs arranged about the flow tube can act to bias the flow tube to its original position when the power to the electrostatic motor is removed, closing the SSSV. In some embodiments, an electrostatic motor can be used as a lock to hold prevent a flow tube from returning to its original position, where the SSSV is closed. In some implementations, pressure can be applied from the surface to equalize pressure across the SSSV, further reducing the load on the electrostatic motor and the power necessary to operate the motor.

Example System

FIG. 1 depicts an example completed well system, according to some embodiments. In FIG. 1, a well system 100 having a wellhead 114 connected to an electrically actuated SSSV (hereinafter "SSSV") 106 via an electrical connection 102. An annulus 108 may be defined between walls of a wellbore 112 and a conduit 110.

The wellhead 114 may provide a means to hand off and seal the conduit 110 against the wellbore 112. The conduit 110 may be coupled to the wellhead 114. The conduit 110 may be any conduit such as a casing, liner, production tubing, or other tubulars disposed in a wellbore. In the following description of the SSSV 106 and other apparatus and methods described herein, directional terms, such as "above", "below", "upper", "lower", etc., are used only for convenience in referring to the accompanying drawings. Additionally, it is to be understood that the various examples of the present electrically actuated SSSV described herein may be utilized in various orientations, such as inclined, inverted, horizontal, vertical, etc., and in various configurations. Although the SSSV 106 is illustrated as being disposed within an onshore wellbore, the SSSV 106 may be disposed in any type of wellbore including offshore type wellbores.

The SSSV 106 may be interconnected in the conduit 110 and positioned in the wellbore 112. The SSSV 106 may provide a means to isolate a lower portion of the conduit 110 from an upper portion of the conduit 110. The lower portion of the conduit 110 may be in fluid communication with a subterranean formation such that formation fluids may flow into the lower portion of the conduit 110. The electrical connection 102 may extend into the wellbore 112 and may be connected to the SSSV 106.

An electrostatic motor 120 can be electrically coupled to the SSSV 106. When supplied with power, the electrostatic motor 120 can open the SSSV 106 to allow for a flow of production fluid from the wellbore 112 to the surface 104 through an interior of the conduit 110, as described in more detail below. For example, the electrical connection 102 may provide power to the electrostatic motor 120. In response to being powered, the electrostatic motor 120 can cause the SSSV 106 to open to provide a flow path for wellbore fluids in a lower portion of conduit 110 to flow into an upper portion of conduit 110. Conversely, in response to stopping supplying of the power to the electrostatic motor 120, the SSSV 106 can close to prevent the flow path for wellbore fluids. Additionally, FIG. 1 depicts the wellbore 112 as a vertical wellbore. However, the SSSV systems of the present disclosure can be positioned within vertical, horizontal, and/or angled wellbores as well.

Example SSSV and Electrostatic Motor Configurations

First Example SSSV and Electrostatic Motor Configuration

Figure 2A:
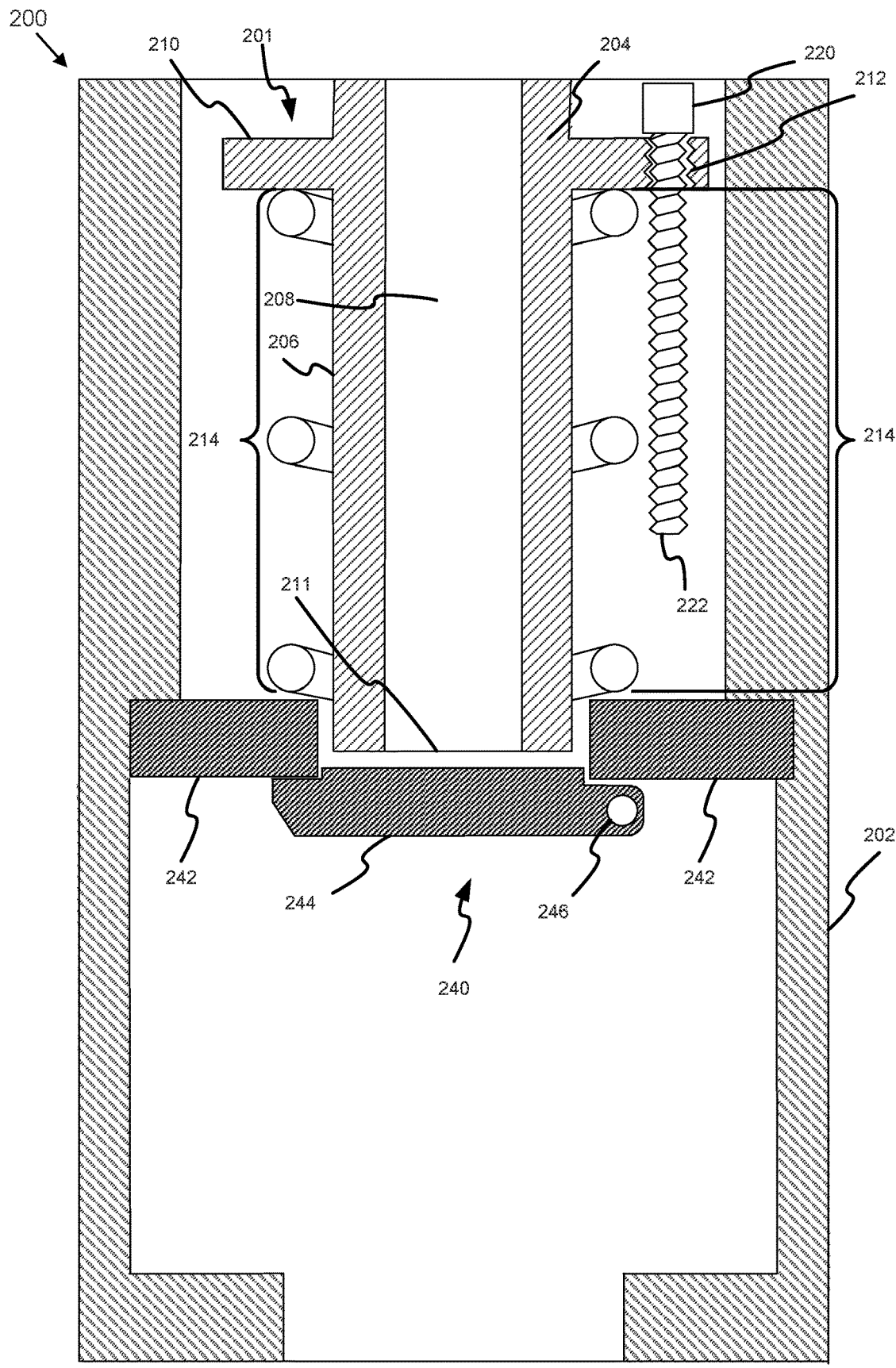
FIGS. 2A-2B depict cross-sectional views of a first example sub-surface safety valve (SSSV) and electrostatic motor configuration in a closed position and an open position, respectively, according to some embodiments.
Figure 2B:
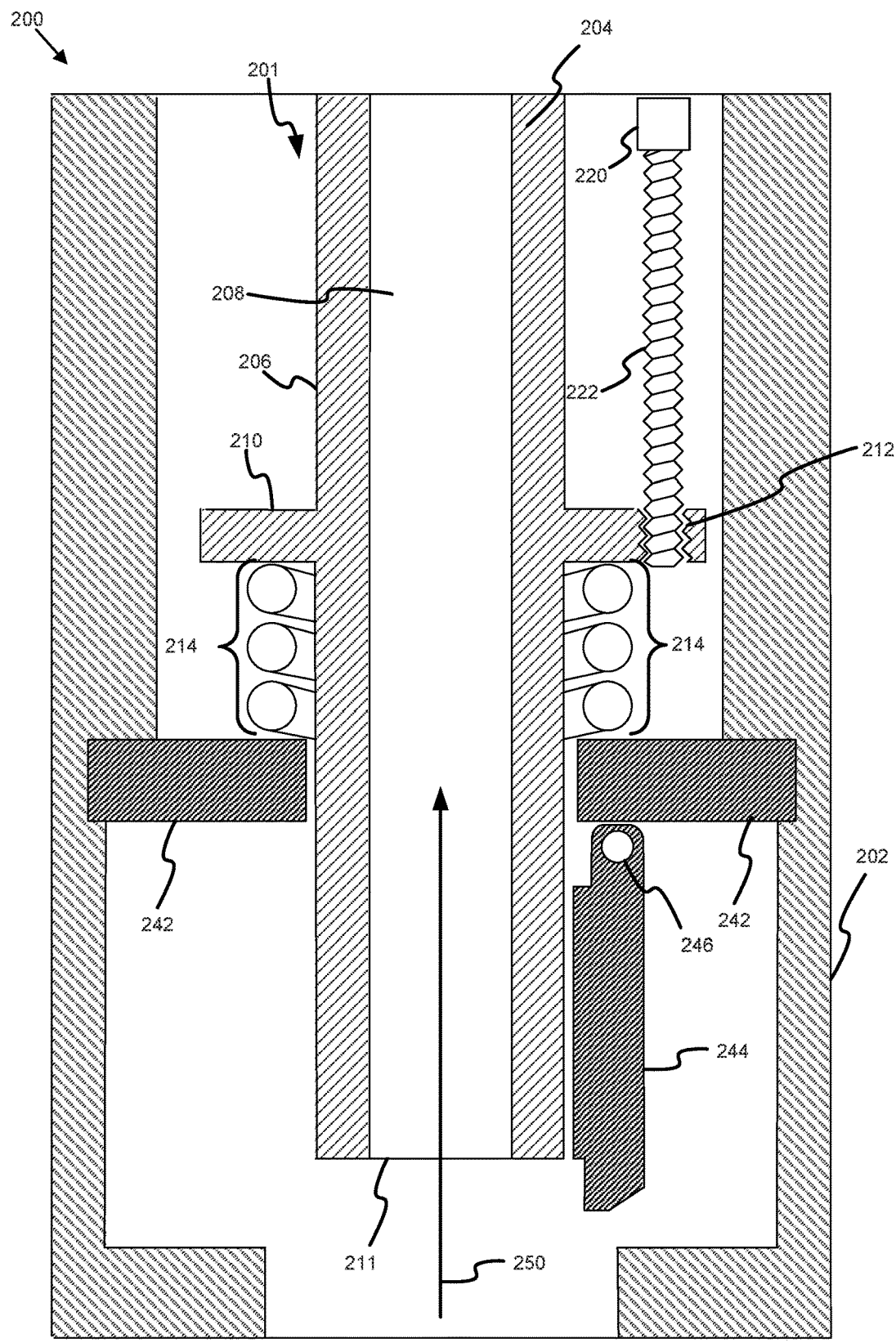

Example SSSV and electrostatic motor configurations of the SSSV 106 and the electrostatic motor 120 depicted in FIG. 1 are now described. FIGS. 2A-2B depict cross-sectional views of a first example sub-surface safety valve (SSSV) and electrostatic motor configuration in a closed position and an open position, respectively, according to some embodiments. In FIG. 2A, an SSSV and electrostatic motor configuration ("configuration") 200 is in a closed position. In FIG. 2B, the configuration 200 is in an open position.

The configuration 200 includes an SSSV 201 and an electrostatic motor 220. The SSSV 201 includes a flow tube 204, a tubing 202, and a valve 240 positioned within and at the bottom end of the tubing 202. With reference to FIG. 1, an upper portion of the conduit 110 can be coupled to a top end of the tubing 202, and a lower portion of the conduit 110 can be coupled to a bottom end of the tubing 202. The flow tube 204 includes a longitudinal portion 206 having a passage 208 therein. The SSSV also includes a flow ring 210 having an internally threaded portion 212 and a drive screw 222. The internally threaded portion 212 can be complimentary to a profile of the drive screw 222 coupled to the electrostatic motor 220.

In some embodiments, power can be supplied to the electrostatic motor 220 to move the SSSV 201 from the closed position to an open position where fluid flows uphole through the flow tube 204. For example, with reference to FIG. 1, the electrical connection 102 can supply the power to the electrostatic motor 220. When power is applied to the electrostatic motor 220, the drive screw 222 can rotate, causing downward axial movement of the flow tube 204 as the flow ring 210 moves axially along the drive screw 222. As the flow tube 204 moves downward, a bottom end 211 of the flow tube 204 abuts a face of the valve 240. Further downward movement of the flow tube 204 opens the valve 240, allowing fluid flow from downhole of the SSSV 201 through the passage 208. To illustrate, FIG. 2B depicts the configuration 200 in the open position. As depicted in FIG. 2B, as the drive screw 222 moves axially downward, the spring 214 is compressed and the flapper 244 is open—resulting in a flow of fluid 250 flowing uphole through the passage 208 of the flow tube 204.

As depicted in FIGS. 2A-2B, the valve 240 is a flapper valve having a flapper seat 242, a flapper 244, and a hinge 246. However, in some embodiments, the valve 240 can be any valve that opens when a downward force is applied to the valve. For example, the valve 240 can instead be a ball valve. As the drive screw 222 rotates, the flow tube 204 moves downhole to move the configuration 200 from the closed position (as depicted in FIG. 2A) to the open position (as depicted in FIG. 2B) by rotating the flapper 244 about the hinge 246.

A spring 214 positioned between the flow ring 210 and the flapper seat 242 biases the flow tube 204 in an uphole direction such that the bottom end 211 of the flow tube 204 does not press downward on the flapper 244 and the SSSV 201 remains in the closed configuration when power is not supplied to the electrostatic motor 220. Further, the spring 214 can act as a fail-safe to close the valve 240 in the event of an electrical failure. For example, power to the electrostatic motor 220 can be removed and the drive screw 222 can be free to rotate in a direction opposite of that when the electrostatic motor 220 is powered, allowing the spring 214 to move the flow tube 204 upward, thus allowing the valve 240 to close. In some embodiments, the valve 240 can include a spring (not pictured) that biases the flapper 244 upward to close the valve 240 when the flow tube 204 is moved upward. For example, the hinge 246 may be a spring loaded hinge having a torsional spring that closes the flapper 244 when force is removed from the flapper 244.

In contrast to traditional motors, the use of an electrostatic motor and a spring can eliminate the need for an electric clutch. Further, electrostatic motors can have a lower power draw when compared to a traditional motor because an electrostatic motor does not need power to rotate a drive screw in an opposite direction, allowing a spring of the valve and/or a pressure gradient to do the work of closing the valve.

To illustrate, FIG. 3 depicts a graph of current draw by an electrostatic motor for SSSV operations of FIGS. 2A-2B as a function of time, according to some embodiments. FIG. 3 shows a graph 300 having a y-axis 306 (current) and an x-axis 304 (time). As shown, the graph 300 includes an example current 302 that is drawn by the electrostatic motor over time during SSSV operations. Example stages of operation of the SSSV 201 include five stages (stages 310, 312, 314, 316, and 318).

At the stage 310, the SSSV is closed and the current draw by the electrostatic motor 220 is at or near zero. At the stage 312, power is supplied to the electrostatic motor 220 to initiate opening of the SSSV. As shown at the stage 312, a current draw rapidly increases in a short time so that the electrostatic motor 220 has the requisite power to rotate the drive screw 222 to overcome the force exerted on the flow tube 204 by the spring 214 as well as a differential pressure across the valve 240 when pressure across the valve 240 is not equalized. After initially overcoming the force exerted by the spring, the current draw by the electrostatic motor 220 can remain relatively constant (seen by the latter part of the stage 312)—as the flow tube 204 moves downward from the closed position as depicted in FIG. 2A to the open position as depicted in FIG. 2B.

At the stage 314, the current draw by the electrostatic motor 220 again rapidly increases in a short time. This increased current draw at the stage 314 is in response to the bottom end 211 of the flow tube 204 abutting the valve 240, thereby increasing the load on the electrostatic motor 220 as the valve 240 begins to open. At the stage 316, the valve 240 is fully open and the spring 214 is compressed, as depicted in FIG. 2B, reducing the current draw by the electrostatic motor 220. Thus, the current draw at the stage 316 is less than the required at the stages 312 and 314. At the stage 318, power is removed from the electrostatic motor 220 so that the SSSV can again be closed. This will result in the current draw by the electrostatic motor 220 decreasing to approximately zero. In response to removing the power, the spring 214 will move the flow tube 204 upward (as the drive screw 222 freely rotates in the opposite direction) to its original position as depicted in FIG. 2A.

Second Example SSSV and Electrostatic Motor Configuration

A second example SSSV and electrostatic motor configuration of the SSSV 106 and the electrostatic motor 120 are now described. In this second example, well pressure can be used to move portions of the SSSV 106 in place in order to open the valve. After moving portions of the SSSV 106 into place, the electrostatic motor 1120 can be used as a locking mechanism to keep the valve open.

Figure 4A:
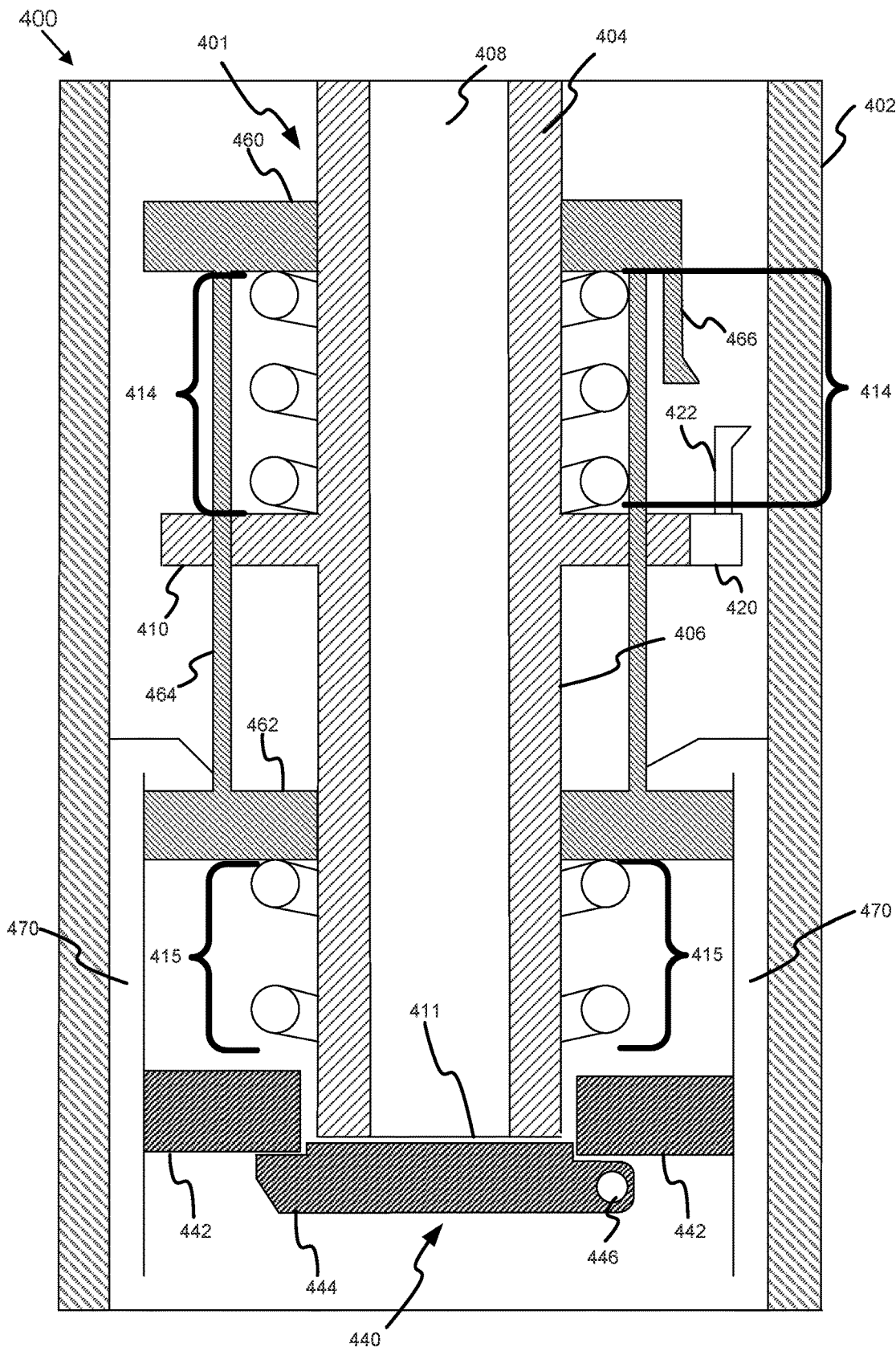
FIGS. 4A-4C depict cross-sectional views of a second example sub-surface safety valve (SSSV) and electrostatic motor configuration in a closed position, a locked position, and an open position, respectively, according to some embodiments.
Figure 4B:
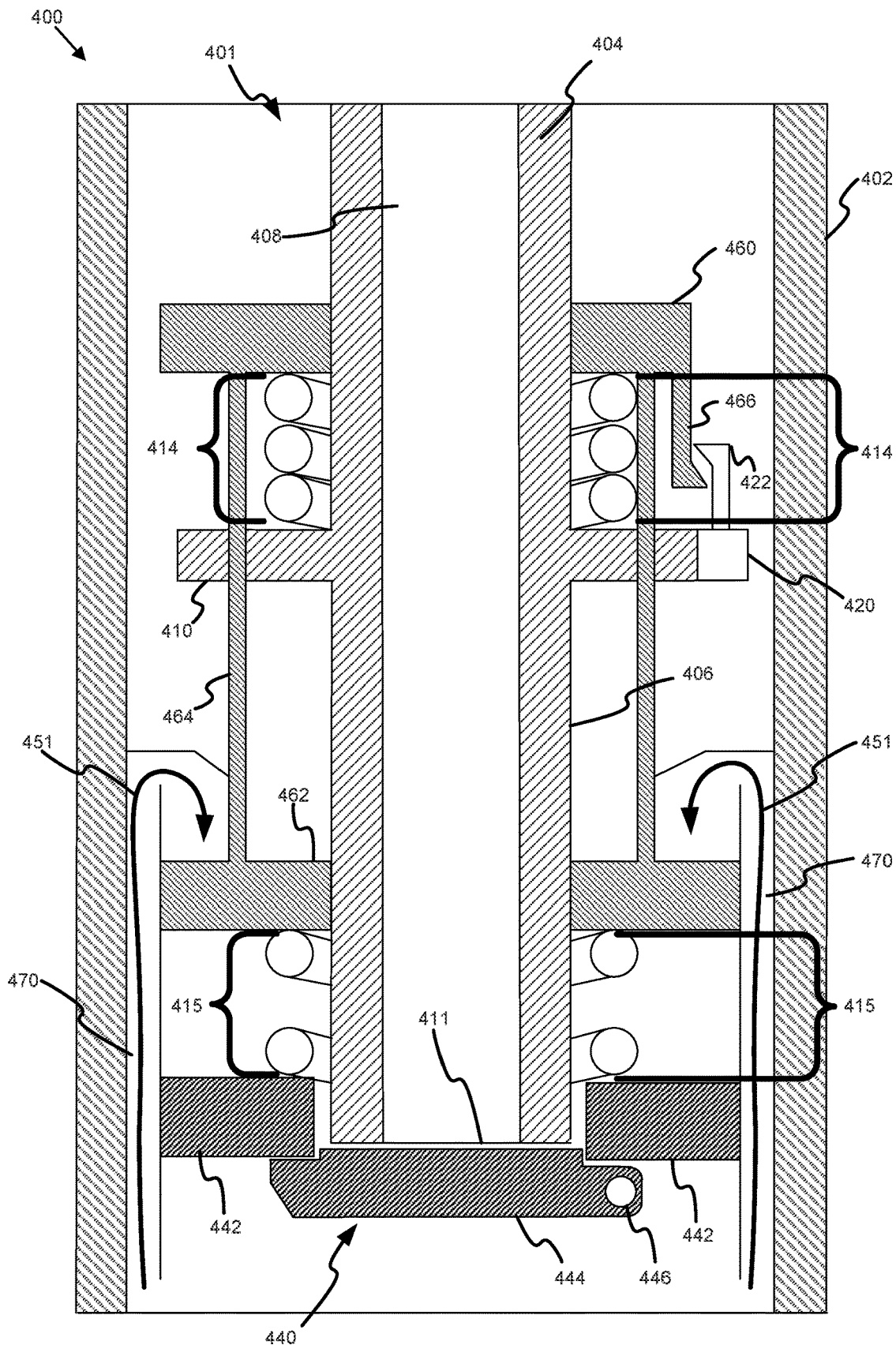
Figure 4C:
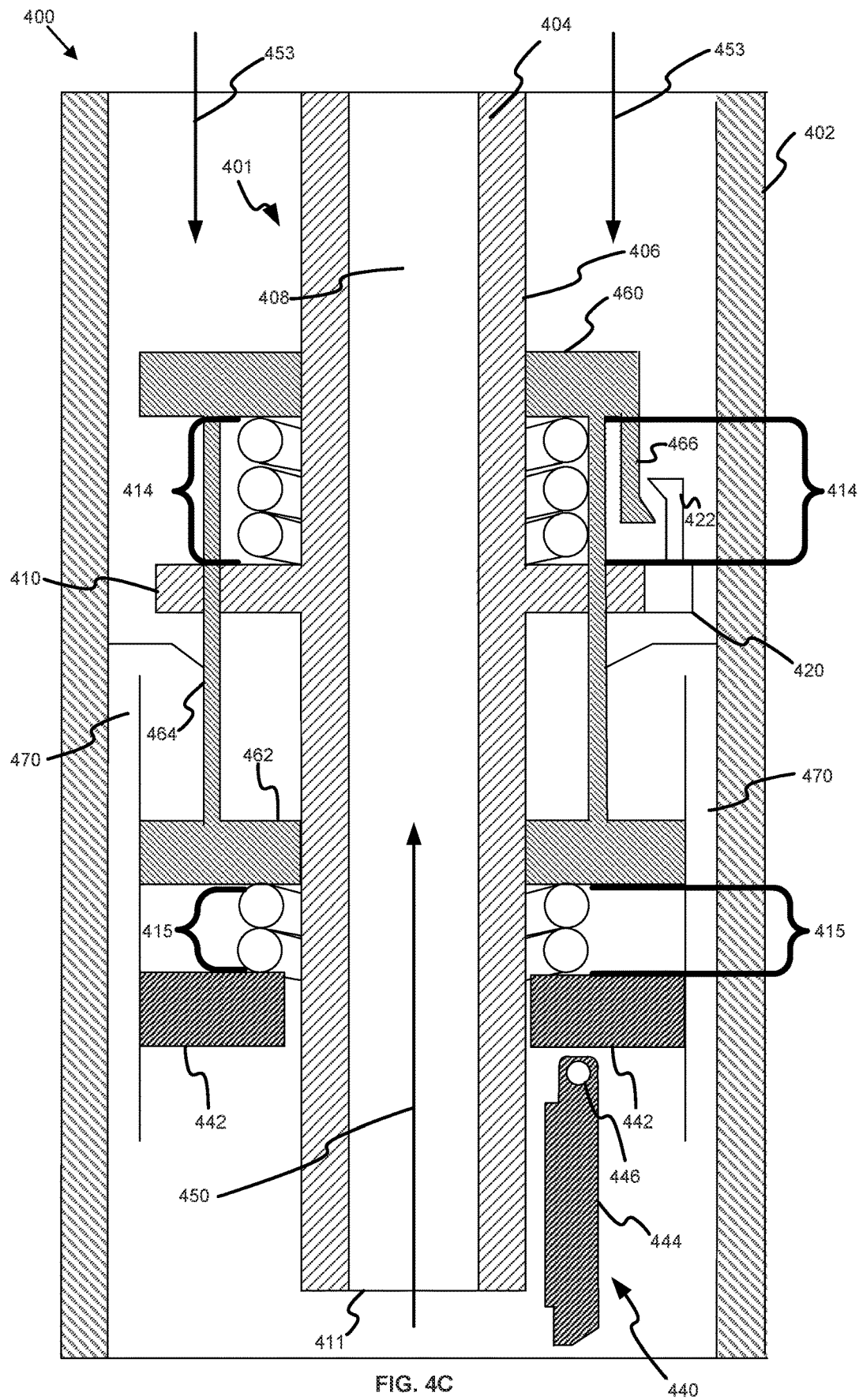

To illustrate, FIGS. 4A-4C depict cross-sectional views of a second example sub-surface safety valve (SSSV) and electrostatic motor configuration in a closed position, a locked position, and an open position, respectively, according to some embodiments. In FIG. 4A, an SSSV and electrostatic motor configuration ("configuration") 400 is in a closed position. In FIG. 4B, the configuration 400 is in a locked position. In FIG. 4C, the configuration 400 is in an open position.

The configuration 400 includes an SSSV 401 and an electrostatic motor 420. The SSSV 401 includes a flow tube 404, plates 460 and 462, a tubing 402, and a valve 440 positioned within and at the bottom end of the tubing 402. The flow tube 404 includes a longitudinal portion 406 having a passage 408 therein and a flow ring 410. In some embodiments, a link 464 rigidly connects the plate 460 to the plate 462 so that movement of either the plate 460 or the plate 462 can cause both plates 460-462 to axially translate. In some embodiments, the link 464 may pass through the flow ring 410 to aid in alignment between the plate 460, the flow ring 410, and the plate 462.

A first spring 414 is positioned between the plate 460 and the flow ring 410. A second spring 415 is positioned between the plate 462 and a flapper seat 442 of the valve 440. The springs 414 and 415 can bias the flow tube 404 in an uphole direction such that a bottom end 411 of the flow tube 404 does not press downward on the flapper 444 and the SSSV 401 can remain in the closed position when power is not supplied to the electrostatic motor 420 and/or pressure across the valve 440 is not equalized.

In some embodiments, the locking mechanism 422 can be coupled to a shaft of the electrostatic motor 420. As shown in FIG. 4B, after the first spring 414 is compressed, the electrostatic motor 420 can be powered to rotate the locking mechanism 422 into place to engage with a latch 466—to maintain compression in the first spring 414. In some embodiments, the locking mechanism 422 may be a CAM, drive screw, or any other locking means to engage with the latch 466 of the plate 460.

In some embodiments, the SSSV 401 can be moved from the closed position, as depicted in FIG. 4A, to an open position by modifying a pressure across the valve 440. FIG. 4B depicts the second example SSSV 401 at an intermediary stage of transitioning between the closed position to an open position, according to some embodiments. A well pressure, as depicted by arrows 451, can act on the plate 462 via channels 470 in fluid communication with a lower portion of the tubing 402 to move the plates 460 and 462 downward, compressing the springs 414 and 415, respectively. The link 464 allows the plates 460 and 462 and the springs 414 and 415 to move independently of the flow tube 404 when locking mechanism 422 is not engaged with the latch 466. Once the plate 460 has compressed the first spring 414, power can be supplied to the electrostatic motor 420 to engage the locking mechanism 422, as previously described.

Once the electrostatic motor 420 is powered and the locking mechanism 422 is engaged, a force can be applied from a surface of the wellbore to move the flow tube 404 axially downward and open the valve 440. To illustrate, FIG. 4C depicts the SSSV 401 in an open position, according to some embodiments. Once the springs 414 and 415 are compressed and the locking mechanism 422 is engaged, a force or pressure can be applied from the surface, as depicted by the arrows 453, to move the flow tube 404 downward until the bottom end 411 abuts a face of the valve 440 and pushes the valve 440 open.

As depicted in FIGS. 4A-4C, the valve 440 is a flapper valve having the flapper seat 442, a flapper 444, and a hinge 446. However, in some embodiments, the valve 440 can be any valve that opens when a downward force is applied to the valve. For example, the valve 440 can instead be a ball valve. As the flow tube 404 moves downhole to move the SSSV 401 from the closed configuration (as depicted in FIG. 4A) to the open configuration (as depicted in FIG. 4C) the flapper 444 rotates about the hinge 446. In some embodiments, the valve 440 can include a spring (not pictured) that biases the flapper 444 upward to close the valve 440 when the flow tube 404 is moved upward. For example, the hinge 446 may be a spring loaded hinge having a torsional spring that closes the flapper 444 when force is removed from the flapper 444. If power to the electrostatic motor 420 is removed at any point, upward movement of the plate 460 will exert a force on the locking mechanism 422, which can rotate freely when the electrostatic motor 420 is not powered, and the SSSV 401 will return to the closed configuration, as depicted in FIG. 4A.

Similar to the first example SSSV system of FIGS. 2A-B, use of an electrostatic motor in opening and closing SSSVs allows for electric well completions (independent of hydraulic control). Further, electrostatic motors require less power than traditional motors and reduce, and in some cases eliminate, the need for an electric clutch. In some embodiments, this can enable the use of smaller downhole power supplies as well as surface control of SSSVs.

Example Operations

Figure 5:
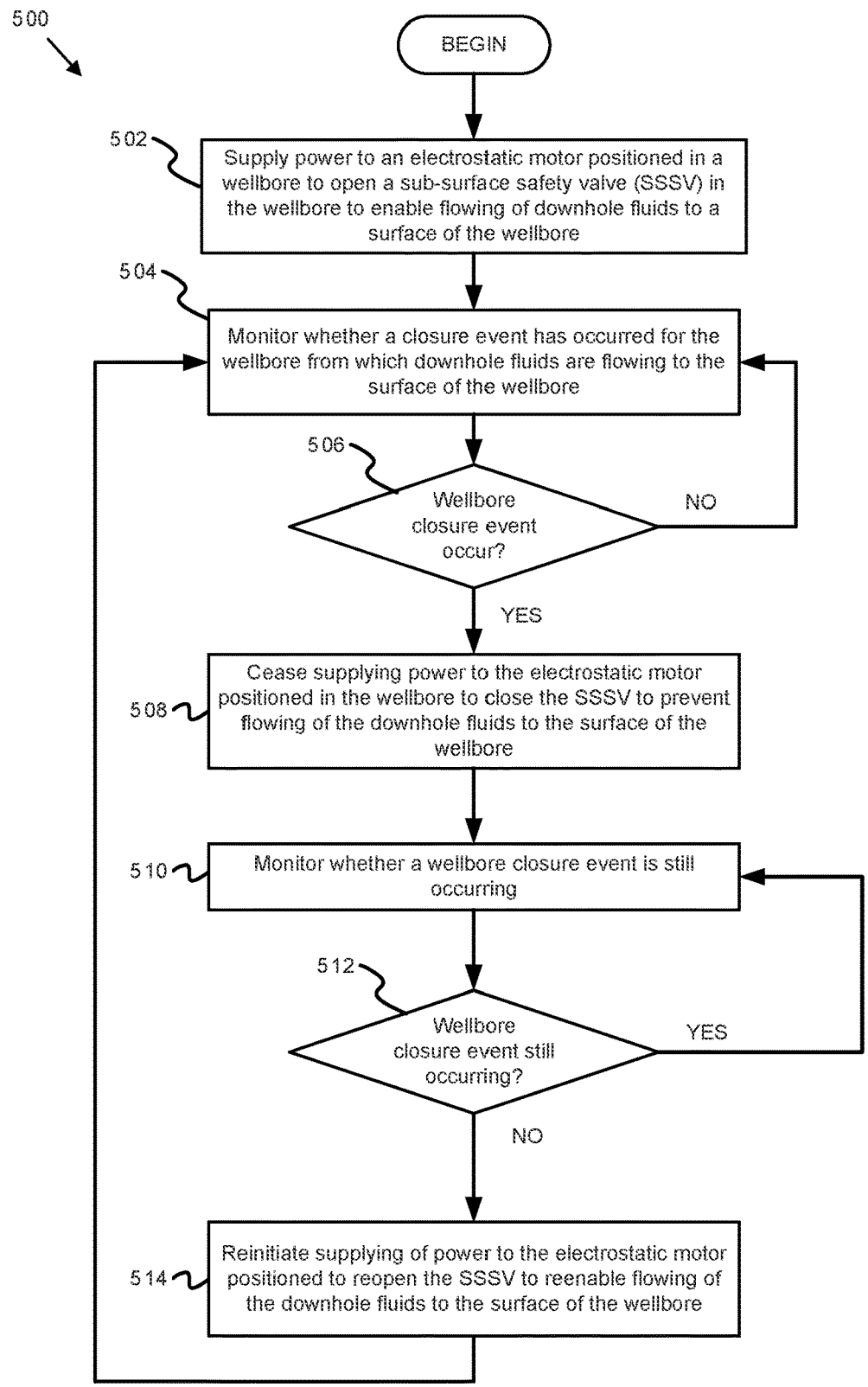
FIG. 5 depicts a flowchart of example operations for using an SSSV and electrostatic motor configuration in an example wellbore operation, according to some embodiments.

FIG. 5 depicts a flowchart of example operations for using an SSSV and electrostatic motor configuration in an example wellbore operation, according to some embodiments. Operations of the flowchart 500 are described in reference to the example system and SSSVs depicted in FIGS. 1-4C.

At block 502, power is supplied to an electrostatic motor to open a sub-surface safety valve (SSSV) positioned in a wellbore to enable flowing of downhole fluids to a surface of the wellbore. For example, with reference to FIG. 1, power can be supplied to the SSSV 106 via the electrical connection 102 to enable downhole fluids from a formation surrounding the wellbore 112 to flow to the surface 104 through the conduit 110.

In some embodiments, the SSSV is opened by rotation of a drive screw coupled to the electrostatic motor. For example, with reference to FIGS. 2A-2B, power can be supplied to the electrostatic motor 220 to rotate the drive screw 222 to move the flow tube 204 downward to open the valve 240. In some embodiments, supplying power to the electrostatic motor engages a locking mechanism to allow for opening of the SSSV. For example, with reference to FIGS. 4A-4C, power can be supplied to the electrostatic motor 420 to engage the locking mechanism 422 to maintain compression in the springs 414 and 415 to hold the valve 440 open.

At block 504, the wellbore is monitored to determine whether a wellbore closure event has occurred. For example, with reference to FIG. 1, sensors positioned within the wellbore 112 and/or the conduit 110 can be monitored for indications of a wellbore closure event. Alternatively or in addition, equipment at the surface of the wellbore can be monitored. In some embodiments, monitoring to determine whether a wellbore closure event has occurred can include monitoring an area surrounding the wellbore. A wellbore closure event can be any event (e.g., equipment failure downhole and/or at the surface that results in an uncontrolled release of the downhole fluid at the surface of the wellbore. For example, in a sub-sea wellbore, water surrounding the conduit can be monitored to determine whether downhole fluids from the wellbore are escaping the conduit into the water.

At block 506, a determination is made whether a wellbore closure event has occurred. For example, with reference to FIG. 1, it can be determined that fluid is escaping the conduit 110 at a position upward of the SSSV 106. Alternatively or in addition, it can be determined that equipment at the surface of the wellbore has failed. For example, it can be determined that a pump (not pictured) at the surface is malfunctioning. If a wellbore closure event has not occurred, flow returns to block 504. If a wellbore closure event has occurred, flow continues at block 508.

At block 508, supplying of power to the electrostatic motor ceases or stops to close the SSSV to prevent the flowing of downhole fluids to the surface of the wellbore. For example, with reference to FIG. 1, a controller can control a power source at the surface supplying the power to the electrostatic motor 120 via the electrical connection 102. The controller can prevent or stop the power source from outputting power being supplied to the electrostatic motor 120. As described above, in response to the electrostatic motor 120 not being powered, the SSSV 106 closes to prevent downhole fluids from flowing to the surface 104 through the conduit 110.

At block 510, the wellbore is monitored to determine whether a wellbore closure event is still occurring. For example, with reference to FIG. 1, sensors positioned within the wellbore 112 and/or the conduit 110 can be monitored for indications of a closure event. Alternatively or in addition, equipment at the surface of the wellbore can be monitored.

At block 512, a determination is made whether a wellbore closure event is still occurring. If a wellbore closure event is still occurring, flow returns to block 510. If a wellbore closure event is not still occurring, flow continues at block 514.

At block 514, supplying power to the electrostatic motor is reinitiated to reopen the SSSV to reenable flowing of downhole fluids to the surface of the wellbore and flow returns to block 504.

FIG. 5 is annotated with a series of numbers 502-514. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 502 and 504 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Example Computer

Figure 6:
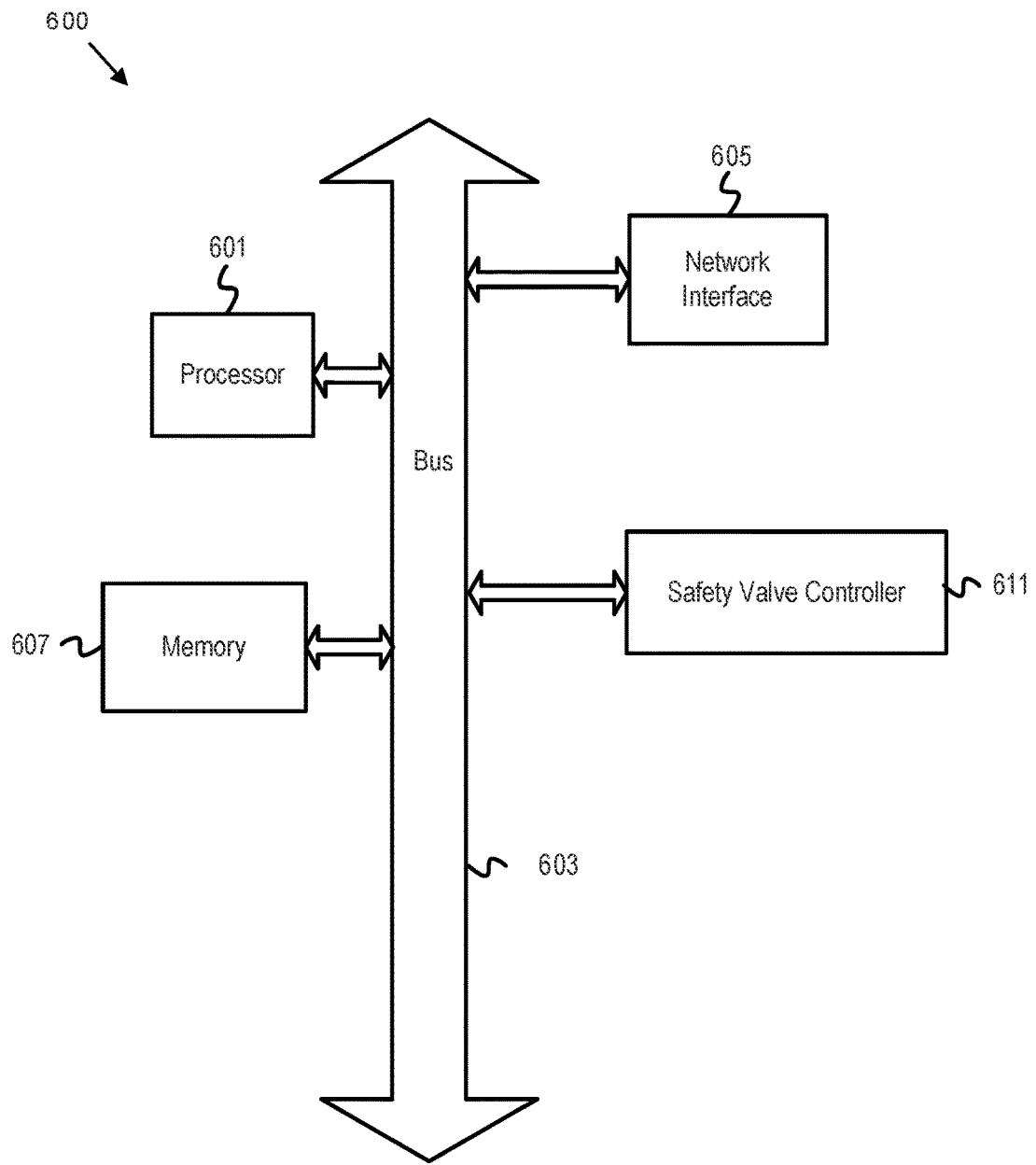
FIG. 6 depicts an example computer, according to some embodiments.

FIG. 6 depicts an example computer, according to some embodiments. In FIG. 6, a computer 600 includes a processor 601 (possibly including multiple processors, multiple cores, multiple nodes, and/or implementing multi-threading, etc.). The computer 600 includes a memory 607. The memory 607 may be system memory or any one or more of the above already described possible realizations of machine-readable media. The computer 600 also includes a bus 603 and a network interface 605. The computer 600 can communicate via transmissions to and/or from remote devices via the network interface 605 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The system also includes a safety valve controller 611. The safety valve controller 611 can perform at least some of the operations described above. For example, the safety valve controller 611 can monitor for a well closure event and control the selective supplying of power to the electrostatic motor (as described above). Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for controlling sub-surface safety valves from a surface as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: An apparatus comprising a sub-surface safety valve (SSSV) to be positioned in a wellbore, the SSSV configurable to move between a closed position and an open position, wherein the SSSV prevents downhole fluid in the wellbore to flow to a surface of the wellbore while in the closed position, and wherein the SSSV allows the downhole fluid in the wellbore to flow to the surface of the wellbore while in the open position; and an electrostatic motor to be positioned in the wellbore and to be coupled to the SSSV, wherein the electrostatic motor is to be selectively powered to move the SSSV between the closed position and the open position.

Embodiment 2: The apparatus of Embodiment 1, wherein the SSSV comprises a flow tube; and a valve positioned at a bottom end of the flow tube, wherein the valve is configurable to move between the closed position and the open position based on power supplied to the electrostatic motor, wherein, in the closed position, the valve is positioned to prevent the downhole fluid to flow from below the SSSV to the surface of the wellbore, wherein, in the open position, the valve is to be positioned to enable the downhole fluid to flow from below the SSSV to flow to the surface of the wellbore.

Embodiment 3: The apparatus of Embodiment 2, wherein the SSSV comprises a flow ring positioned at a top end of the flow tube; a spring positioned below the flow ring; and a screw drive having a top end coupled to the electrostatic motor and a bottom end coupled to and positioned above the flow ring, wherein, in response to activation of the electrostatic motor, the screw drive is to rotate to move the flow ring down to compress the spring.

Embodiment 4: The apparatus of Embodiment 1, wherein a locking mechanism is coupled to a shaft of the electrostatic motor, and wherein the SSSV is to move from the closed position to the open position in response to the electrostatic motor being powered to rotate the locking mechanism to a lock position.

Embodiment 5: The apparatus of Embodiment 4, wherein the SSSV is to move from the open position back to the closed position in response to the electrostatic motor being unpowered to rotate the locking mechanism to an unlock position.

Embodiment 6: The apparatus of Embodiment 5, wherein the SSSV comprises a top plate; a flow ring positioned below the top plate; and a top spring positioned between the top plate and the flow ring, wherein the flow ring is to move toward the top plate to compress the top spring in response to exposure of a wellbore pressure from below the SSSV to within the SSSV, wherein, after the top spring is compressed, the electrostatic motor is to be powered to rotate the locking mechanism to the lock position to retain position of the flow ring to maintain compression of the top spring.

Embodiment 7: The apparatus of Embodiment 6, wherein the SSSV comprises a flow tube; and a valve positioned at a bottom end of the flow tube, wherein the valve is configurable to move between the closed position and the open position, wherein, in the closed position, the valve is positioned to prevent the downhole fluid to flow from below the SSSV to the surface of the wellbore, wherein, in the open position, the valve is to be moved from the closed position to the open position in response to exposure of a surface pressure within the flow tube.

Embodiment 8: The apparatus of Embodiment 7, wherein the valve is a flapper valve and wherein the SSSV comprises a bottom plate that is linked to the top plate; a flapper seat; and a bottom spring positioned between the bottom plate and the flapper seat, wherein the bottom plate is to move toward the flapper seat to compress the bottom spring in response to exposure of the wellbore pressure from below the SSSV to within the SSSV.

Embodiment 9: A system comprising a production tubing to be positioned in a wellbore and through which a downhole fluid flows from downhole to a surface of the wellbore; a sub-surface safety valve (SSSV) to be positioned within the production tubing, the SSSV configurable to move between a closed position and an open position, wherein the SSSV is prevent the downhole fluid to flow to the surface of the wellbore while in the closed position, and wherein the SSSV is to allow the downhole fluid to flow to the surface of the wellbore while in the open position; an electrostatic motor to be coupled to the SSSV; an electrical conduit to couple a power source at the surface to the electrostatic motor; a sensor to detect a wellbore closure event; and a controller coupled to the sensor and the power source, wherein the controller is to control the power source to cause the power source to supply power to the electrostatic motor to move the SSSV in the open position in response to no detection of the wellbore closure event by the sensor, wherein the controller is to control the power source to cause the power source to cease supplying the power to the electrostatic motor to move the SSSV from the open position to the closed position in response to detection of the wellbore closure event by the sensor.

Embodiment 10: The system of Embodiment 9, wherein the SSSV comprises a flow tube; and a valve positioned at a bottom end of the flow tube, wherein the valve is configurable to move between the closed position and the open position based on the power supplied to the electrostatic motor, wherein, in the closed position, the valve is positioned to prevent the downhole fluid to flow from below the SSSV to the surface of the wellbore, wherein, in the open position, the valve is to be positioned to enable the downhole fluid to flow from below the SSSV to flow to the surface of the wellbore.

Embodiment 11: The system of Embodiment 10, wherein the SSSV comprises a flow ring positioned at a top end of the flow tube; a spring positioned below the flow ring; and a screw drive having a top end coupled to the electrostatic motor and a bottom end coupled to and positioned above the flow ring, wherein, in response to activation of the electrostatic motor, the screw drive is to rotate to move the flow ring down to compress the spring.

Embodiment 12: The system of Embodiment 9, wherein a locking mechanism is coupled to a shaft of the electrostatic motor, and wherein the SSSV is to move from the closed position to the open position in response to the electrostatic motor being powered to rotate the locking mechanism to a lock position.

Embodiment 13: The system of Embodiment 12, wherein the SSSV is to move from the open position back to the closed position in response to the electrostatic motor being unpowered to rotate the locking mechanism to an unlock position.

Embodiment 14: The system of Embodiment 13, wherein the SSSV comprises a top plate; a flow ring positioned below the top plate; and a top spring positioned between the top plate and the flow ring, wherein the flow ring is to move toward the top plate to compress the top spring in response to exposure of a wellbore pressure from below the SSSV to within the SSSV, wherein, after the top spring is compressed, the electrostatic motor is to be powered to rotate the locking mechanism to the lock position to retain position of the flow ring to maintain compression of the top spring.

Embodiment 15: The system of Embodiment 14, wherein the SSSV comprises a flow tube; a flapper valve positioned at a bottom end of the flow tube, wherein the flapper valve is configurable to move between the closed position and the open position, wherein, in the closed position, the flapper valve is positioned to prevent the downhole fluid to flow from below the SSSV to the surface of the wellbore, wherein, in the open position, the flapper valve is to be moved from the closed position to the open position in response to exposure of a surface pressure within the flow tube; a bottom plate that is linked to the top plate; a flapper seat; and a bottom spring positioned between the bottom plate and the flapper seat, wherein the bottom plate is to move toward the flapper seat to compress the bottom spring in response to exposure of the wellbore pressure from below the SSSV to within the SSSV.

Embodiment 16: A method comprising supplying power to an electrostatic motor to open a sub-surface safety valve (SSSV) positioned in a wellbore to enable flowing of a downhole fluid to a surface of the wellbore; monitoring whether a wellbore closure event has occurred for the wellbore from which the downhole fluid is flowing to the surface of the wellbore; in response to a determination that the wellbore closure event has occurred, ceasing the supplying of the power to the electrostatic motor to close the SSSV to prevent flowing of the downhole fluid to the surface of the wellbore; and after the wellbore closure event has occurred and in response to a determination that the wellbore closure event is no longer occurring, supplying of the power to the electrostatic motor to reopen the SSSV to reenable the flowing of the downhole fluid to the surface of the wellbore.

Embodiment 17: The method of Embodiment 16, wherein supplying the power to the electrostatic motor comprises supplying the power from a power source at the surface of the wellbore to the electrostatic motor positioned in the wellbore.

Embodiment 18: The method of Embodiment 16 or 17, wherein the SSSV comprises a flow tube and a flapper valve positioned at a bottom end of the flow tube, wherein supplying the power to the electrostatic motor to open the SSSV comprises supplying the power to move the flow tube downward to push the flapper valve open.

Embodiment 19: The method of Embodiment 16 or 17, wherein a locking mechanism is coupled to a shaft of the electrostatic motor, and wherein supplying the power to the electrostatic motor to open the SSSV comprises supplying the power to the electrostatic motor to rotate the locking mechanism to a lock position.

Embodiment 20: The method of any one of Embodiments 16-19, wherein the wellbore closure event comprises a failure of equipment that results in an uncontrolled release of the downhole fluid at the surface of the wellbore.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. An apparatus comprising:
a sub-surface safety valve (SSSV) to be positioned in a wellbore, the SSSV configurable to move between a closed position and an open position, wherein the SSSV prevents flow of downhole fluid in the wellbore to a surface of the wellbore while in the closed position, and wherein the SSSV allows the downhole fluid in the wellbore to flow to the surface of the wellbore while in the open position;
an electrostatic motor coupled to the SSSV, wherein the electrostatic motor is to be selectively powered to move the SSSV between the closed position and the open position; and
a locking mechanism coupled to a shaft of the electrostatic motor, wherein the SSSV is to move from the closed position to the open position in response to the electrostatic motor being powered to rotate the locking mechanism to a lock position.

2. The apparatus of claim 1, wherein the SSSV comprises:
a flow tube; and
a valve positioned at a bottom end of the flow tube, wherein the valve is configurable to move between the closed position and the open position based on power supplied to the electrostatic motor,
wherein, in the closed position, the valve is positioned to prevent the downhole fluid to flow from below the SSSV to the surface of the wellbore,
wherein, in the open position, the valve is to be positioned to enable the downhole fluid to flow from below the SSSV to flow to the surface of the wellbore.

3. The apparatus of claim 2, wherein the SSSV comprises:
a flow ring positioned at a top end of the flow tube;
a spring positioned below the flow ring; and
a screw drive having a top end coupled to the electrostatic motor and a bottom end coupled to and positioned above the flow ring, wherein, in response to activation of the electrostatic motor, the screw drive is to rotate to move the flow ring down to compress the spring.

4. The apparatus of claim 1, wherein the SSSV is to move from the open position back to the closed position in response to the electrostatic motor being unpowered to rotate the locking mechanism to an unlock position.

5. The apparatus of claim 4, wherein the SSSV comprises:
a top plate;
a flow ring positioned below the top plate; and
a top spring positioned between the top plate and the flow ring, wherein the flow ring is to move toward the top plate to compress the top spring in response to exposure of a wellbore pressure from below the SSSV to within the SSSV,
wherein, after the top spring is compressed, the electrostatic motor is to be powered to rotate the locking mechanism to the lock position to retain position of the flow ring to maintain compression of the top spring.

6. The apparatus of claim 5, wherein the SSSV comprises:
a flow tube; and
a valve positioned at a bottom end of the flow tube, wherein the valve is configurable to move between the closed position and the open position,
wherein, in the closed position, the valve is positioned to prevent the downhole fluid to flow from below the SSSV to the surface of the wellbore,
wherein, in the open position, the valve is to be moved from the closed position to the open position in response to exposure of a surface pressure within the flow tube.

7. The apparatus of claim 6, wherein the valve is a flapper valve and wherein the SSSV comprises:
a bottom plate that is linked to the top plate;
a flapper seat; and
a bottom spring positioned between the bottom plate and the flapper seat, wherein the bottom plate is to move toward the flapper seat to compress the bottom spring in response to exposure of the wellbore pressure from below the SSSV to within the SSSV.

8. A system comprising:
a production tubing to be positioned in a wellbore and through which a downhole fluid flows from downhole to a surface of the wellbore;
a sub-surface safety valve (SSSV) to be positioned within the production tubing, the SSSV configurable to move between a closed position and an open position, wherein the SSSV is prevent the downhole fluid to flow to the surface of the wellbore while in the closed position, and wherein the SSSV is to allow the downhole fluid to flow to the surface of the wellbore while in the open position;
an electrostatic motor coupled to the SSSV;
a locking mechanism coupled to a shaft of the electrostatic motor, wherein the SSSV is to move from the closed position to the open position in response to the electrostatic motor being powered to rotate the locking mechanism to a lock position;
an electrical conduit to couple a power source at the surface to the electrostatic motor;
a sensor to detect a wellbore closure event; and
a controller coupled to the sensor and the power source, wherein the controller is to control the power source to cause the power source to supply power to the electrostatic motor to move the SSSV in the open position in response to no detection of the wellbore closure event by the sensor,
wherein the controller is to control the power source to cause the power source to cease supplying the power to the electrostatic motor to move the SSSV from the open position to the closed position in response to detection of the wellbore closure event by the sensor.

9. The system of claim 8, wherein the SSSV comprises:
a flow tube; and
a valve positioned at a bottom end of the flow tube, wherein the valve is configurable to move between the closed position and the open position based on the power supplied to the electrostatic motor,
 wherein, in the closed position, the valve is positioned to prevent the downhole fluid to flow from below the SSSV to the surface of the wellbore,
 wherein, in the open position, the valve is to be positioned to enable the downhole fluid to flow from below the SSSV to flow to the surface of the wellbore.

10. The system of claim 9, wherein the SSSV comprises:
 a flow ring positioned at a top end of the flow tube;
 a spring positioned below the flow ring; and
 a screw drive having a top end coupled to the electrostatic motor and a bottom end coupled to and positioned above the flow ring, wherein, in response to activation of the electrostatic motor, the screw drive is to rotate to move the flow ring down to compress the spring.

11. The system of claim 8, wherein the SSSV is to move from the open position back to the closed position in response to the electrostatic motor being unpowered to rotate the locking mechanism to an unlock position.

12. The system of claim 11, wherein the SSSV comprises:
 a top plate;
 a flow ring positioned below the top plate; and
 a top spring positioned between the top plate and the flow ring, wherein the flow ring is to move toward the top plate to compress the top spring in response to exposure of a wellbore pressure from below the SSSV to within the SSSV,
 wherein, after the top spring is compressed, the electrostatic motor is to be powered to rotate the locking mechanism to the lock position to retain position of the flow ring to maintain compression of the top spring.

13. The system of claim 12, wherein the SSSV comprises:
 a flow tube;
 a flapper valve positioned at a bottom end of the flow tube, wherein the flapper valve is configurable to move between the closed position and the open position,
  wherein, in the closed position, the flapper valve is positioned to prevent the downhole fluid to flow from below the SSSV to the surface of the wellbore,
  wherein, in the open position, the flapper valve is to be moved from the closed position to the open position in response to exposure of a surface pressure within the flow tube;
 a bottom plate that is linked to the top plate;
 a flapper seat; and
 a bottom spring positioned between the bottom plate and the flapper seat, wherein the bottom plate is to move toward the flapper seat to compress the bottom spring in response to exposure of the wellbore pressure from below the SSSV to within the SSSV.

14. A method comprising:
 supplying power to an electrostatic motor coupled with a locking mechanism to open a sub-surface safety valve (SSSV) positioned in a wellbore to enable flowing of a downhole fluid to a surface of the wellbore, wherein the locking mechanism is coupled to a shaft of the electrostatic motor, wherein supplying the power to the electrostatic motor to open the SSSV comprises supplying the power to the electrostatic motor to rotate the locking mechanism to a lock position;
 monitoring whether a wellbore closure event has occurred for the wellbore from which the downhole fluid is flowing to the surface of the wellbore;
 in response to a determination that the wellbore closure event has occurred,
  ceasing the supplying of the power to the electrostatic motor to close the SSSV to prevent flowing of the downhole fluid to the surface of the wellbore; and
 after the wellbore closure event has occurred and in response to a determination that the wellbore closure event is no longer occurring,
  supplying of the power to the electrostatic motor to reopen the SSSV to reenable the flowing of the downhole fluid to the surface of the wellbore.

15. The method of claim 14, wherein supplying the power to the electrostatic motor comprises supplying the power from a power source at the surface of the wellbore to the electrostatic motor positioned in the wellbore.

16. The method of claim 14, wherein the wellbore closure event comprises a failure of equipment that results in an uncontrolled release of the downhole fluid at the surface of the wellbore.

17. The method of claim 14,
 wherein the SSSV comprises a flow tube and a flapper valve positioned at a bottom end of the flow tube,
 wherein supplying the power to the electrostatic motor to open the SSSV comprises supplying the power to move the flow tube downward to push the flapper valve open.

* * * * *